(12) United States Patent
Song et al.

(10) Patent No.: US 12,736,380 B2
(45) Date of Patent: Sep. 15, 2026

(54) MEASUREMENT APPARATUS AND METHOD

(71) Applicant: ROLLS-ROYCE plc, London (GB)

(72) Inventors: Jin L Song, Birmingham (GB); Garry Marchington, Derby (GB); Simon J Donovan, Nottingham (GB)

(73) Assignee: ROLLS-ROYCE plc, London (GB)

( * ) Notice: Subject to any disclaimer, the term of this patent is extended or adjusted under 35 U.S.C. 154(b) by 296 days.

(21) Appl. No.: 18/751,412

(22) Filed: Jun. 24, 2024

(65) Prior Publication Data

US 2025/0020497 A1 Jan. 16, 2025

(30) Foreign Application Priority Data

Jul. 10, 2023 (GB) ..................................... 2310544

(51) Int. Cl.

| | |
|---|---|
| ***G01F 9/00*** | (2006.01) |
| ***B22F 10/25*** | (2021.01) |
| ***B22F 10/34*** | (2021.01) |
| ***B22F 10/85*** | (2021.01) |
| ***B22F 12/90*** | (2021.01) |

(Continued)

(52) U.S. Cl.
CPC .............. *G01F 9/003* (2013.01); *B22F 10/25* (2021.01); *B22F 10/34* (2021.01); *B22F 10/85* (2021.01); *B22F 12/90* (2021.01); *B33Y 40/00* (2014.12); *G01F 1/30* (2013.01); *G01F 25/14* (2022.01); *B22F 12/53* (2021.01); *G01F 1/76* (2013.01)

(58) Field of Classification Search
CPC . G01F 9/001; G01F 9/003; G01F 1/30; G01F 25/14; G01F 1/76; B22F 10/25; B22F 10/34; B22F 10/85; B22F 12/90; B22F 12/53; B33Y 40/00
See application file for complete search history.

(56) References Cited

U.S. PATENT DOCUMENTS

| | | | | |
|---|---|---|---|---|
| 6,268,571 | B1 * | 7/2001 | Benyukhis ........... | G01G 19/393 177/25.18 |
| 7,915,565 | B2 | 3/2011 | Clark et al. | |

(Continued)

FOREIGN PATENT DOCUMENTS

| | | |
|---|---|---|
| CN | 102250584 A | 11/2011 |
| CN | 102328091 A | 1/2012 |

(Continued)

OTHER PUBLICATIONS

Dec. 20, 2023 Search Report issued in British Patent Application No. 2310544.8.

*Primary Examiner* — Benjamin R Schmitt
(74) *Attorney, Agent, or Firm* — Oliff PLC

(57) ABSTRACT

A measurement apparatus for measuring a flow rate of a powder includes a casing, a nozzle configured to dispense the powder, a fixture plate, a weighing scale, and a powder collector. The fixture plate includes a plurality of pinhole members. Each pinhole member includes a tip, a cylindrical hole extending from the tip, and a discharge passage. The cylindrical hole of each pinhole member has a diameter. The diameters of the cylindrical holes of the plurality of pinhole members are different from each other. The nozzle is configured to dispense the powder selectively into the cylindrical hole, and the powder collector is configured to receive at least a portion of the powder from the discharge passage.

20 Claims, 10 Drawing Sheets

(51) Int. Cl.

| | |
|---|---|
| ***B33Y 40/00*** | (2020.01) |
| ***G01F 1/30*** | (2006.01) |
| ***G01F 25/10*** | (2022.01) |
| *B22F 12/53* | (2021.01) |
| *G01F 1/76* | (2006.01) |

(56) References Cited

U.S. PATENT DOCUMENTS

| | | | | |
|---|---|---|---|---|
| 2018/0215601 | A1* | 8/2018 | Shuck | B22F 10/25 |
| 2021/0308766 | A1 | 10/2021 | Frechard et al. | |
| 2022/0250158 | A1* | 8/2022 | Fujimaki | B22F 10/25 |
| 2023/0048362 | A1* | 2/2023 | Liu | B29C 64/343 |

FOREIGN PATENT DOCUMENTS

| | | | |
|---|---|---|---|
| DE | 10 2014 206 767 | B3 | 3/2015 |
| EP | 3 355 044 | A1 | 8/2018 |
| KR | 10-2016-0024679 | A | 3/2016 |
| KR | 10-2016-0033876 | A | 3/2016 |
| WO | 2021/165545 | A1 | 8/2021 |

* cited by examiner

MEASUREMENT APPARATUS AND METHOD

CROSS-REFERENCE TO RELATED APPLICATIONS

This specification is based upon and claims the benefit of priority from United Kingdom patent application number GB 2310544.8 filed on Jul. 10, 2023, the entire contents of which is incorporated herein by reference.

BACKGROUND

1. Field of the Disclosure

The present disclosure generally relates to a measurement apparatus for measuring a flow rate of a powder and a method for measuring the flow rate of the powder.

2. Description of the Related Art

Additive manufacturing techniques, such as, directed energy deposition (DED), may be used to fabricate components by depositing material layer-by-layer or volume-by-volume successively along a build direction based on a digital representation of the component. Example techniques for DED may include directing an energy beam (e.g., a laser beam) at a region of a substrate of the component to form an advancing molten pool and delivering material from a spray nozzle to the advancing molten pool. The melt pool is then simultaneously deposited onto the substrate to form a deposited volume or layer of the material.

Blown powder DED typically utilizes a metallic powder of selected particle size and composition that is blown at or adjacent to the melt pool. A distance between a tip of the spray nozzle and a material deposition point is typically known as “stand-off distance”. It may be vital to accurately and quickly determine a powder flow rate through the spray nozzle as the powder flow rate may influence geometry, porosity, crack, and mechanical properties of the deposited components. Further, variation of the powder flow rate with the stand-off distance may be important for a deposition stability and a powder catchment efficiency.

Techniques for measurement of powder flow rate are well known. Traditionally, an operator injects an inert gas into a measurement chamber and the spray nozzle of selected dimensions dispenses a powder through a single size hole feature. The measurement chamber is then evacuated, and a weight of the powder collected from the single size hole feature is measured using an external scale. All these operations are carried out manually by using dedicated plastic gloves.

Depending on specifications and condition of the spray nozzle, different size hole features may be required. With the traditional measurement systems, the measurement chamber needs to be evacuated in order to implement new size hole features with different dimensions. Further, the stand-off distance needs to be changed during the measurement process to determine an optimum stand-off distance for improving efficiency. The above measurement process may need to be repeated until the optimum stand-off distance is determined. Thus, the measurement chamber may need to be evacuated each time the weight of the powder is determined (using the external scale) with the varying stand-off distance. This causes the entire measurement process to be time consuming and not suitable for production.

SUMMARY

According to a first aspect, there is provided a measurement apparatus for measuring a flow rate of a powder. The measurement apparatus includes a casing and a nozzle movably disposed within the casing. The nozzle includes at least one delivery channel configured to dispense the powder. The measurement apparatus further includes a fixture plate disposed within and mounted to the casing. The fixture plate includes a main body including a top surface facing the nozzle and a bottom surface spaced apart from and opposite to the top surface. The fixture plate further includes a plurality of pinhole members extending at least partially from the top surface and spaced apart from each other. Each pinhole member from the plurality of pinhole members includes a tip spaced apart from the top surface, a cylindrical hole extending from the tip towards the top surface, and a discharge passage extending from the bottom surface at least partially through the main body and disposed in fluid communication with the cylindrical hole. The cylindrical hole of each pinhole member has a diameter and is configured to receive the powder from the nozzle. The diameters of the cylindrical holes of the plurality of pinhole members are different from each other. The measurement apparatus further includes a weighing scale disposed within the casing underneath the fixture plate. The measurement apparatus further includes a powder collector disposed on the weighing scale and facing the fixture plate. The nozzle is configured to dispense the powder selectively into the cylindrical hole of each pinhole member. The powder collector is configured to receive at least a portion of the powder from the discharge passage of each pinhole member.

The measurement apparatus of the present disclosure includes the fixture plate disposed within and mounted to the casing. The fixture plate includes the plurality of pinhole members. The diameters of the cylindrical holes of the plurality of pinhole members are different from each other. This may allow the flow rate of the powder to be measured using different diameters of the cylindrical holes.

The nozzle may dispense the powder selectively into the cylindrical hole of each pinhole member. Specifically, the measurement apparatus may be programmed to selectively position the nozzle above the cylindrical hole of each pinhole member for dispensing the powder. Thus, the measurement apparatus may allow automatic measurement of the flow rate of the powder, thereby eliminating the traditional manual process. This may enhance a repeatability of the measurement process.

The weighing scale is disposed within the casing underneath the fixture plate. Thus, the casing may not require to be evacuated for determining the weight of the powder received in the powder collector after passing through the corresponding pinhole member. This may allow measurement data to be obtained quickly and accurately. Furthermore, a stand-off distance may be modified during the measurement process for determining the optimum stand-off distance. Thus, the flow rate of the powder from the nozzle may be measured multiple times, each time at a different distance between a tip of the nozzle and the tip of the corresponding pinhole member.

In some embodiments, each pinhole member further includes a frustoconical external surface extending from the top surface and tapering towards the tip. Each pinhole member further includes a frustoconical internal surface spaced apart from and coaxial with the frustoconical external surface. The frustoconical internal surface extends from the bottom surface beyond the top surface and fully defines the discharge passage, such that the discharge passage is frustoconical and tapers from the bottom surface towards the cylindrical hole. The frustoconical external surface may allow extra powder that does not pass through the cylindrical hole to clear off from the tip of the corresponding pinhole member. The frustoconical internal surface of the discharge passage may allow the powder received from the cylindrical hole to unrestrictedly pass through the fixture plate and get collected in the powder collector.

In some embodiments, each pinhole member further includes a cylindrical connecting passage fluidly communicating the cylindrical hole with the discharge passage, such that the discharge passage tapers from the bottom surface to the cylindrical connecting passage. A diameter of the cylindrical connecting passage is at least twice the diameter of the cylindrical hole. The cylindrical connecting passage may allow the powder received within the cylindrical hole to smoothly pass to the discharge passage.

In some embodiments, an axial length of the cylindrical hole is at least twice an axial length of the cylindrical connecting passage. An axial length of the discharge passage is at least thrice the axial length of the cylindrical hole. This may allow unrestricted flow of the powder from the cylindrical hole to the discharge passage in an accurate manner.

In some embodiments, the cylindrical hole, the cylindrical connecting passage, and the discharge passage are coaxial with each other. This may allow the powder received within the cylindrical hole to flow through the fixture plate in an unrestricted manner.

In some embodiments, each pinhole member further includes a conical portion tapering from the top surface to the tip and forming the frustoconical external surface and at least a portion of the frustoconical internal surface. The conical portion includes a top section disposed at the tip. The top section fully defines the cylindrical hole and the cylindrical connecting passage. The conical portion may allow extra powder that does not pass through the cylindrical hole to clear off from the tip of the corresponding pinhole member. Further, the top section may fluidly couple the cylindrical hole with the cylindrical connecting passage.

In some embodiments, a height of the conical portion from the top surface is less than a thickness of the main body between the top surface and the bottom surface. This may allow the conical portion to extend away from the top surface, thereby defining the frustoconical external surface and at least the portion of the frustoconical internal surface.

In some embodiments, a minimum diameter of the discharge passage is greater than the diameter of the cylindrical hole. This may allow the powder received within the cylindrical hole to flow to the discharge passage in an unrestricted manner.

In some embodiments, the fixture plate further includes a wide member spaced apart from each pinhole member and extending at least partially from the top surface. The wide member includes a wide distal end spaced apart from the top surface and a wide cylindrical passage extending from the wide distal end to the bottom surface at least partially through the main body. The wide cylindrical passage has a wide diameter that is at least five times the diameter of the cylindrical hole of each pinhole member. The nozzle is configured to dispense the powder selectively into the wide cylindrical passage of the wide member. The powder collector is configured to receive at least a portion of the powder from the wide cylindrical passage of the wide member. The wide diameter of the wide cylindrical passage may allow unrestricted flow of the powder received from the nozzle to the powder collector, thereby enabling determination of a total powder flow mass dispensed by the nozzle in a predetermined period of time.

In some embodiments, the wide member further includes a wide conical portion extending from the top surface and including a wide frustoconical external surface. Thus, the wide conical portion defines at least a portion of the wide cylindrical passage. The wide frustoconical external surface may allow extra powder that does not pass through the wide cylindrical passage to clear off from a top opening of the wide cylindrical passage.

In some embodiments, the measurement apparatus further includes one or more positioning features disposed on the top surface. The one or more positioning features may allow calibration of a position of the nozzle with respect to the fixture plate.

In some embodiments, the measurement apparatus further includes a support structure fixedly coupled to the casing. The fixture plate is adjustably mounted to the support structure. The support structure may support the fixture plate within the casing in a reliable manner while allowing the fixture plate to be adjusted relative to the casing.

In some embodiments, the casing includes a bottom wall, one or more side walls extending from the bottom wall, and a top wall coupled to the one or more side walls opposite to the bottom wall. The weighing scale is disposed on the bottom wall. The support structure is coupled to one of the side walls. The one of the side wall may allow the support structure to be fixedly coupled to the casing. The bottom wall may allow the weighing scale to be placed within the casing, thereby eliminating use of external scales for the measurement process.

In some embodiments, the support structure includes a first member fixedly coupled to the one of the side walls of the casing. The support structure further includes a second member including a vertical portion adjustably coupled to the first member and a horizontal portion extending parallel to the top surface. The fixture plate is adjustably coupled to the horizontal portion. The support structure further includes a pair of arms. Each of the pair of arms includes a first arm end coupled to the vertical portion and a second arm end coupled to the horizontal portion. The first member may allow the support structure to be fixedly coupled to the casing. The vertical portion may be adjusted relative to the first member and the fixture plate may be adjusted relative to the horizontal portion when required.

In some embodiments, the vertical portion of the second member is adjustable relative to the first member along a first direction substantially parallel to the top surface. The fixture plate is adjustable relative to the horizontal portion along a second direction substantially parallel to the top surface and perpendicular to the first direction. This may allow the fixture plate to be adjusted relative to the casing in both the first direction and the second direction.

In some embodiments, the casing is filled with an inert gas. This may eliminate contamination of the powder within the measurement apparatus.

According to a second aspect, there is provided a method for measuring a flow rate of a powder. The method includes providing a casing. The method further includes movably receiving a nozzle within the casing. The nozzle includes at least one delivery channel configured to dispense the powder. The method further includes providing a fixture plate disposed within and mounted to the casing. The fixture plate includes a main body including a top surface facing the nozzle and a bottom surface spaced apart from and opposite to the top surface. The fixture plate further includes a plurality of pinhole members extending at least partially from the top surface and spaced apart from each other. Each pinhole member from the plurality of pinhole members includes a tip spaced apart from the top surface, a cylindrical hole extending from the tip towards the top surface, and a discharge passage extending from the bottom surface at least partially through the main body and disposed in fluid communication with the cylindrical hole. The cylindrical hole of each pinhole member has a diameter and is configured to receive the powder from the nozzle. The diameters of the cylindrical holes of the plurality of pinhole members are different from each other. The method further includes providing a weighing scale underneath the fixture plate within the casing. The method further includes providing a powder collector on the weighing scale and facing the fixture plate. The method further includes filling the casing with an inert gas. The method further includes positioning the nozzle above the cylindrical hole at a predetermined distance from the tip of one pinhole member from the plurality of pinhole members. The method further includes dispensing the powder through the at least one delivery channel for a predetermined period of time. The method further includes recording, via the weighing scale, the weight of the powder received in the powder collector.

The method may allow the flow rate of the powder to be measured using different diameters of the cylindrical holes. The nozzle may dispense the powder into the cylindrical hole of the one pinhole member. Specifically, the nozzle may be programmed to position the nozzle above the cylindrical hole of the one pinhole member for dispensing the powder. Thus, the method may allow automatic measurement of the flow rate of the powder. This may enhance the repeatability of the measurement process. Further, the casing may not require to be evacuated for determining the weight of the powder collected in the powder collector after passing through the corresponding pinhole member since the weighing scale is disposed within the casing underneath the fixture plate. This may allow the measurement data to be determined quickly and accurately.

In some embodiments, the fixture plate further includes a wide member spaced apart from each pinhole member and extending at least partially from the top surface. The wide member includes a wide distal end spaced apart from the top surface and a wide cylindrical passage extending from the wide distal end to the bottom surface at least partially through the main body. The wide cylindrical passage has a wide diameter that is at least five times the diameter of the cylindrical hole of each pinhole member. The method further includes positioning the nozzle above the wide member at the predetermined distance from the wide distal end of the wide member prior to positioning the nozzle above the one pinhole member. The method further includes dispensing the powder through the at least one delivery channel for the predetermined period of time. The method further includes recording, via the weighing scale, the weight of the powder received in the powder collector. The method may allow determination of the total flow rate of the powder in the predetermined period of time since the wide diameter of the wide cylindrical passage may allow unrestricted flow of the powder received from the nozzle to the powder collector.

In some embodiments, the method further includes resetting the weighing scale prior to positioning the nozzle above the one pinhole member. This may allow accurate measurement of the weight of the powder received in the powder collector after the powder is dispensed into the one pinhole member.

In some embodiments, the method further includes modifying the predetermined distance of the nozzle from the tip of the one pinhole member. Thus, the method may allow the predetermined distance to be modified during the measurement process for determining the optimum stand-off distance.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION

Aspects and embodiments of the present disclosure will now be discussed with reference to the accompanying figures. Further aspects and embodiments will be apparent to those skilled in the art.

Figure 1:
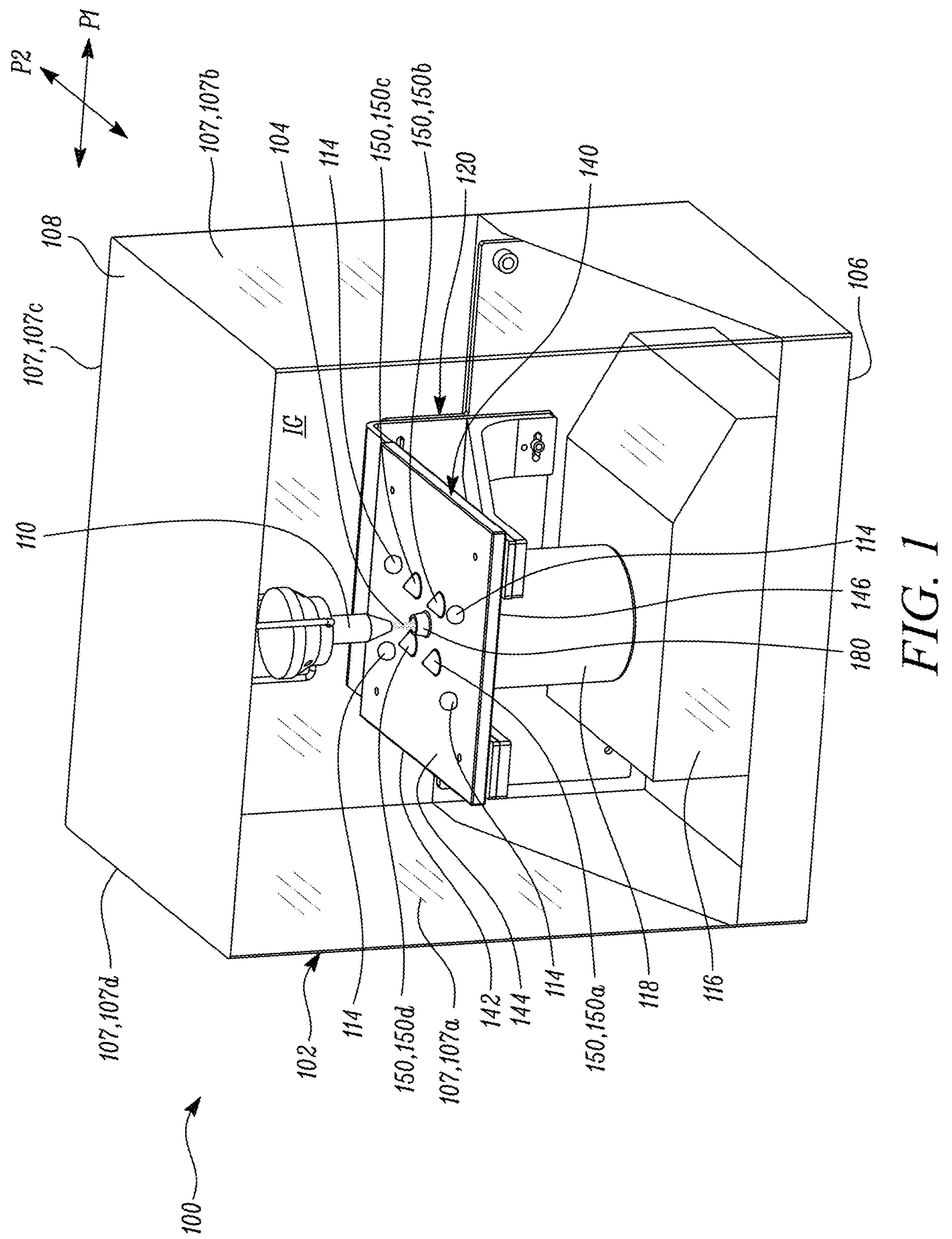
FIG. 1 is a schematic top perspective view of a measurement apparatus, according to an embodiment of the present disclosure.

FIG. 1 is a schematic top perspective view of a measurement apparatus 100 for measuring a flow rate of a powder 104. The measurement apparatus 100 includes a casing 102. In some embodiments, the casing 102 may be an hermetically sealed casing. In some embodiments, the casing 102 is filled with an inert gas IG. This may eliminate contamination of the powder 104 within the measurement apparatus 100. Examples of the inert gas IG may include, but are not limited to, argon, helium, hydrogen, nitrogen, carbon dioxide, or any combination thereof.

In some embodiments, the casing 102 may be made from a plastic (e.g. acrylonitrile butadiene styrene, polylactic acid, polyethylene terephthalate, high-density polyethylene, polyvinyl chloride, polymethyl methacrylate, or the like), a metal (e.g. aluminium, brass, bronze, copper, steel, or the like), an alloy, a combination of both a plastic and a metal, or the like. The casing 102 includes a bottom wall 106, one or more side walls 107 extending from the bottom wall 106, and a top wall 108 coupled to the one or more side walls 107 opposite to the bottom wall 106. Specifically, the casing 102 includes four side walls 107*a*, 107*b*, 107*c*, 107*d*. The bottom wall 106 and the top wall 108 are coupled to the side walls 107*a*, 107*b*, 107*c*, 107*d* to form an hermetically sealed housing. In some embodiments, the one or more side walls 107 of the casing 102 may be substantially transparent.

The measurement apparatus 100 further includes a nozzle 110 movably disposed within the casing 102. In some embodiments, the measurement apparatus 100 may further include arrangements (not shown) for moving the nozzle 110 within the casing 102. For example, the arrangements for moving the nozzle 110 may include a computer numeric control (CNC) machine. In some embodiments, the measurement apparatus 100 may be programmed to move the nozzle 110 within the casing 102.

In some embodiments, the nozzle 110 may be a part of a laser blown powder direct energy deposition (LBP-DED) system (not shown). LBP-DED is an additive manufacturing (AM) process in which successive layers or volumes of material are typically deposited on a substrate of a component along a build direction based on a digital representation of the component. LBP-DED systems generally include directing an energy beam, i.e. a laser beam, at a region of the substrate of the component to form an advancing molten pool. A metallic powder is blown into the melt pool (e.g. via the nozzle 110) and then simultaneously deposited onto the substrate to construct the component in a layer-by-layer manner. It should be understood that DED systems may also utilize any other type of energy beam.

LBP-DED systems may use powder of selected particle size and composition that is blown at or adjacent to the melt pool. During deposition, spatial distribution of the powder (referred to herein as a nozzle distribution pattern) may determine an actual delivery region in which the powder is delivered. When the actual delivery region is not substantially similar to a target delivery region, i.e., in or around the advancing molten pool, deposition defects may occur. For example, the powder may be left partially or fully unmelted, or otherwise unincorporated in the melt pool, or less powder than intended may be incorporated in the melt pool, leading to smaller than intended material addition. In either case, deviation from an expected amount of powder incorporation may lead to defects in the formed component, such as voids, inclusions, unwanted material phases or microstructures, poor cohesion, chambers that include residual, unjoined material, unintended vibration frequencies during operation of the component, blocked channels or openings, audible sound, such as rustling or rattling during use, or the like.

The geometry, porosity, crack, and mechanical properties of the components produced by LBP-DED systems depend on operational parameters, such as feed rate of the powder and incident laser power intensity. The feed rate of the powder is directly related to a distance between the nozzle 110 and a material deposition point, typically known as stand-off distance. An optimum stand-off distance may improve a deposition stability and a powder catchment efficiency, which is a percentage of the powder that reaches the melt pool. Therefore, before actual laser powder deposition, it is important to know the flow rate of the powder.

The measurement apparatus 100 may allow measurement of the flow rate of the powder 104 dispensed by the nozzle 110 as a function of a distance between a tip of the nozzle 110 and a common plane. The measurement apparatus 100 may allow determination of the nozzle distribution pattern by direct measurements of the powder 104 dispensed by the nozzle 110. The nozzle 110 includes at least one delivery channel 112 (shown in FIGS. 7 and 8) configured to dispense the powder 104. The flow rate of the powder 104 may need to be determined during the operational life of the nozzle 110, e.g. after a given service cycle. Determination of accurate flow rate of the powder 104 may improve the powder catchment efficiency. This may improve an overall efficiency of the LBP-DED systems.

The measurement apparatus 100 further includes a fixture plate 140 disposed within and mounted to the casing 102. In some embodiments, the measurement apparatus 100 further includes a support structure 120 fixedly coupled to the casing 102. The fixture plate 140 is adjustably mounted to the support structure 120. The support structure 120 may support the fixture plate 140 within the casing in a reliable manner while allowing the fixture plate 140 to be adjusted relative to the casing 102. In some embodiments, the support structure 120 is coupled to one of the side walls 107. In the illustrated embodiment of FIG. 1, the support structure 120 is fixedly coupled to the side wall 107*c*.

The fixture plate 140 includes a main body 142 including a top surface 144 facing the nozzle 110 and a bottom surface 146 spaced apart from and opposite to the top surface 144. The fixture plate 140 further includes a plurality of pinhole members 150 extending at least partially from the top surface 144 and spaced apart from each other. In the illustrated embodiment of FIG. 1, the plurality of pinhole members 150 include four pinhole members 150*a*, 150*b*, 150*c*, 150*d*. However, it should be understood that the plurality of pinhole members 150 may include any number of the pinhole members 150.

In some embodiments, the fixture plate 140 further includes a wide member 180 spaced apart from each pinhole member 150*a*, 150*b*, 150*c*, 150*d* and extending at least partially from the top surface 144. In some embodiments, the nozzle 110 is configured to dispense the powder 104 selectively into the wide member 180. Further, the nozzle 110 is configured to dispense the powder 104 selectively into each pinhole member 150*a*, 150*b*, 150*c*, 150*d*. In some embodiments, the nozzle 110 is configured to dispense the powder 104 for a predetermined period of time.

In some embodiments, the measurement apparatus 100 further includes one or more positioning features 114 disposed on the top surface 144 of the fixture plate 140. In some embodiments, the nozzle 110 may further include a sensor (e.g., an imaging sensor, such as a camera) that determines a position of the nozzle 110 with respect to the fixture plate 140. For example, the sensor may be disposed on or within the nozzle 110 and may be configured to determine the position of the nozzle 110 with respect to the one or more positioning features 114. In some embodiments, the one or more positioning features 114 may allow calibration of the position of the nozzle 110 with respect to the fixture plate 140.

The measurement apparatus 100 further includes a weighing scale 116 disposed within the casing 102 underneath the fixture plate 140. In some embodiments, the weighing scale 116 is disposed on the bottom wall 106 of the casing 102. The bottom wall 106 may allow the weighing scale 116 to be placed within the casing 102, thereby eliminating use of external scales for the measurement process. The measurement apparatus 100 further includes a powder collector 118 disposed on the weighing scale 116 and facing the fixture plate 140. The powder collector 118 is configured to receive at least a portion of the powder 104 from the wide member 180. Further, the powder collector 118 is configured to receive at least a portion of the powder 104 from each pinhole member 150. The weighing scale 116 may indicate a weight of the powder 104 received in the powder collector 118.

Figure 2:
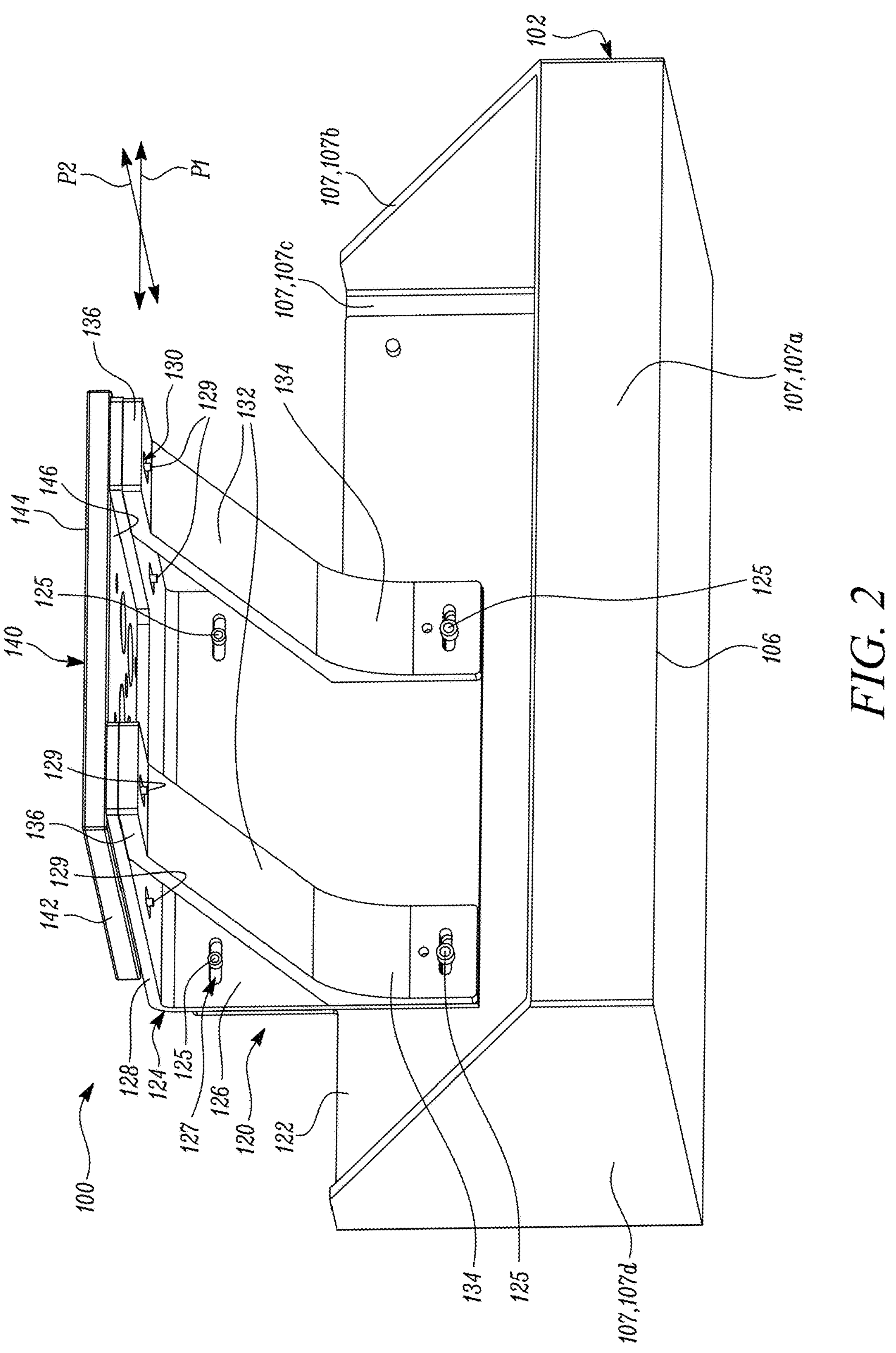
FIG. 2 is a schematic partial bottom perspective cut-away view of the measurement apparatus with some components not shown.

FIG. 2 is a schematic partial bottom perspective cut-away view of the measurement apparatus 100. Some components, e.g., the nozzle 110, the weighing scale 116, and the powder collector 118 of the measurement apparatus 100 are not shown for the purpose of illustration. In some embodiments, the support structure 120 includes a first member 122 fixedly coupled to the one of the side walls 107*c* of the casing 102. The first member 122 may allow the support structure 120 to be fixedly coupled to the casing 102. In some embodiments, the support structure 120 further includes a second member 124 including a vertical portion 126 adjustably coupled to the first member 122 and a horizontal portion 128 extending parallel to the top surface 144.

In some embodiments, the support structure 120 further includes a pair of arms 132. Each of the pair of arms 132 includes a first arm end 134 coupled to the vertical portion 126 and a second arm end 136 coupled to the horizontal portion 128. The pair of arms 132 may provide support to the horizontal portion 128 and the fixture plate 140. In some embodiments, the first arm end 134 is fixedly coupled to the vertical portion 126 and the second arm end 136 is fixedly coupled to the horizontal portion 128.

In some embodiments, the vertical portion 126 of the second member 124 is adjustable relative to the first member 122 along a first direction P1 (also shown in FIG. 1) substantially parallel to the top surface 144. In some embodiments, the vertical portion 126 is coupled to the first member 122 via one or more vertical fasteners 125. In some embodiments, each vertical fastener 125 is received through a corresponding vertical slot 127 of the vertical portion 126. In some embodiments, the vertical slot 127 of the vertical portion 126 may extend along the first direction P1. Thus, the vertical slot 127 may allow the vertical portion 126 to be adjusted relative to the first member 122 along the first direction P1.

In some embodiments, the fixture plate 140 is adjustably coupled to the horizontal portion 128. In some embodiments, the fixture plate 140 is adjustable relative to the horizontal portion 128 along a second direction P2 (also shown in FIG. 1) substantially parallel to the top surface 144 and perpendicular to the first direction P1. In some embodiments, the fixture plate 140 is coupled to the horizontal portion 128 via one or more horizontal fasteners 129. In some embodiments, each horizontal fastener 129 is received through a corresponding horizontal slot 130 of the horizontal portion 128. In some embodiments, the horizontal slot 130 of the horizontal portion 128 may extend along the second direction P2. Thus, the horizontal slot 130 may allow the fixture plate 140 to be adjusted relative to the horizontal portion 128 along the second direction P2. Thus, the fixture plate 140 may be adjusted relative to the casing 102 in both the first direction P1 and the second direction P2.

Figure 3:
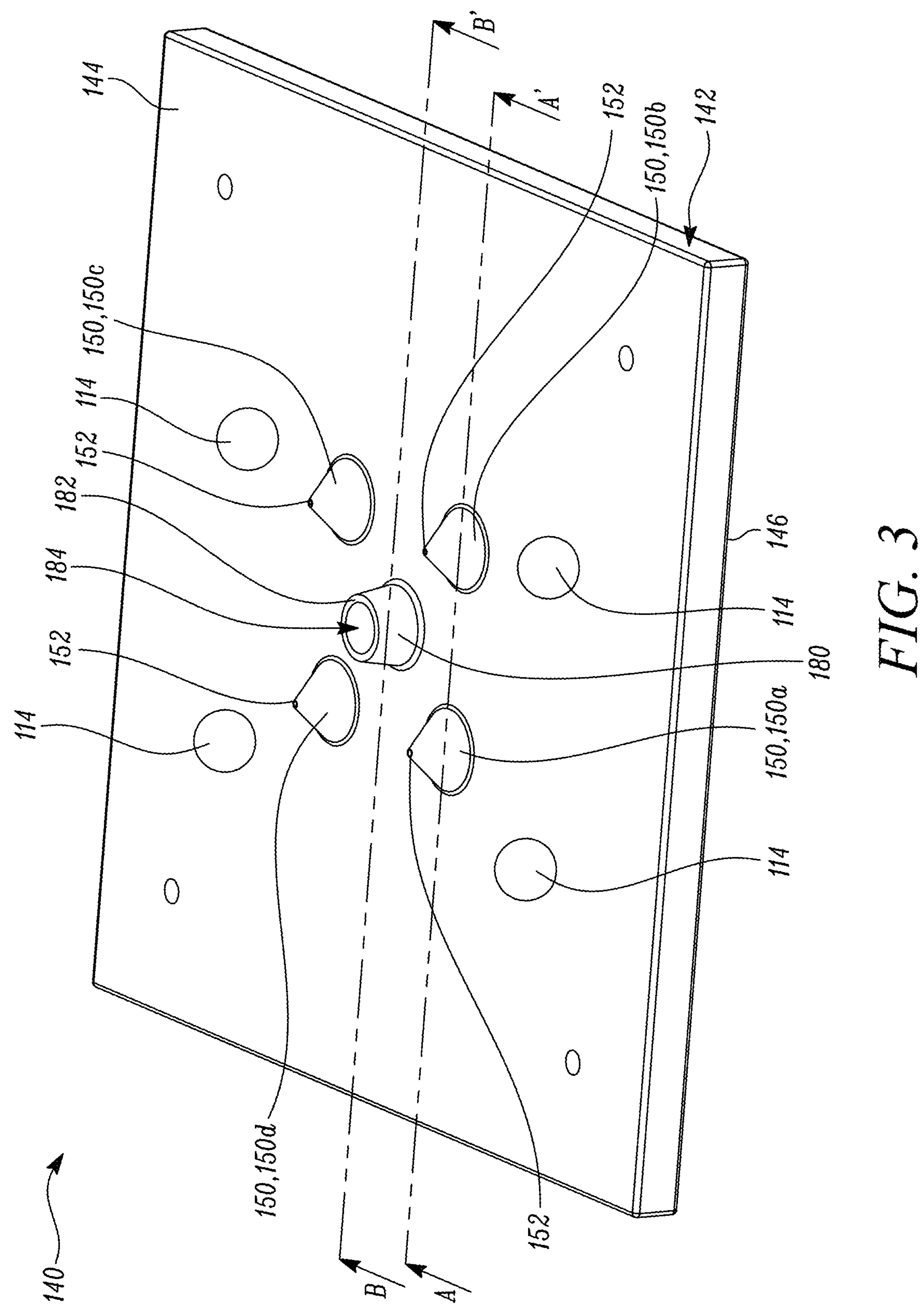
FIG. 3 is a schematic top perspective view of a fixture of the measurement apparatus.
Figure 4:
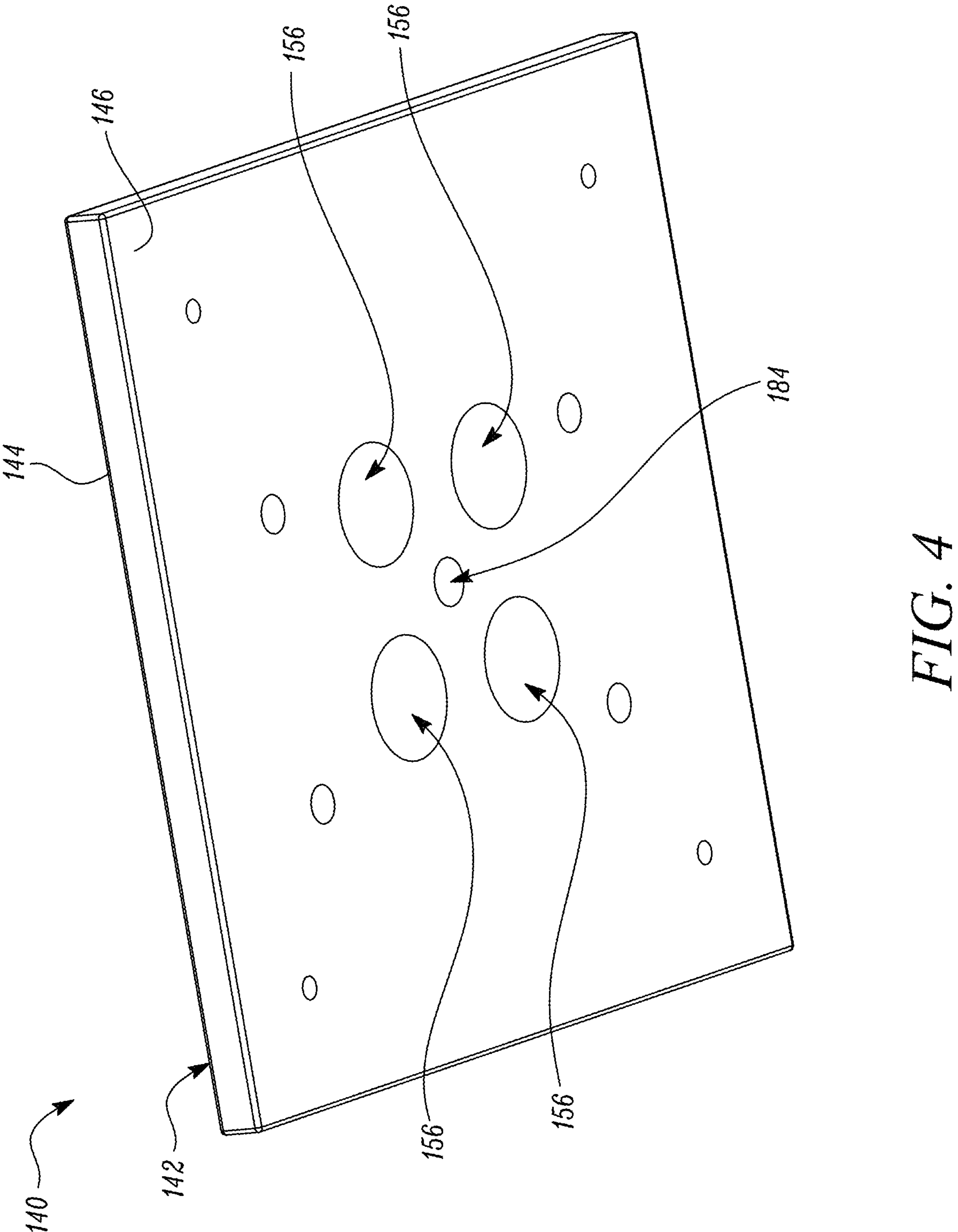
FIG. 4 is a schematic bottom perspective view of the fixture.
Figure 5:
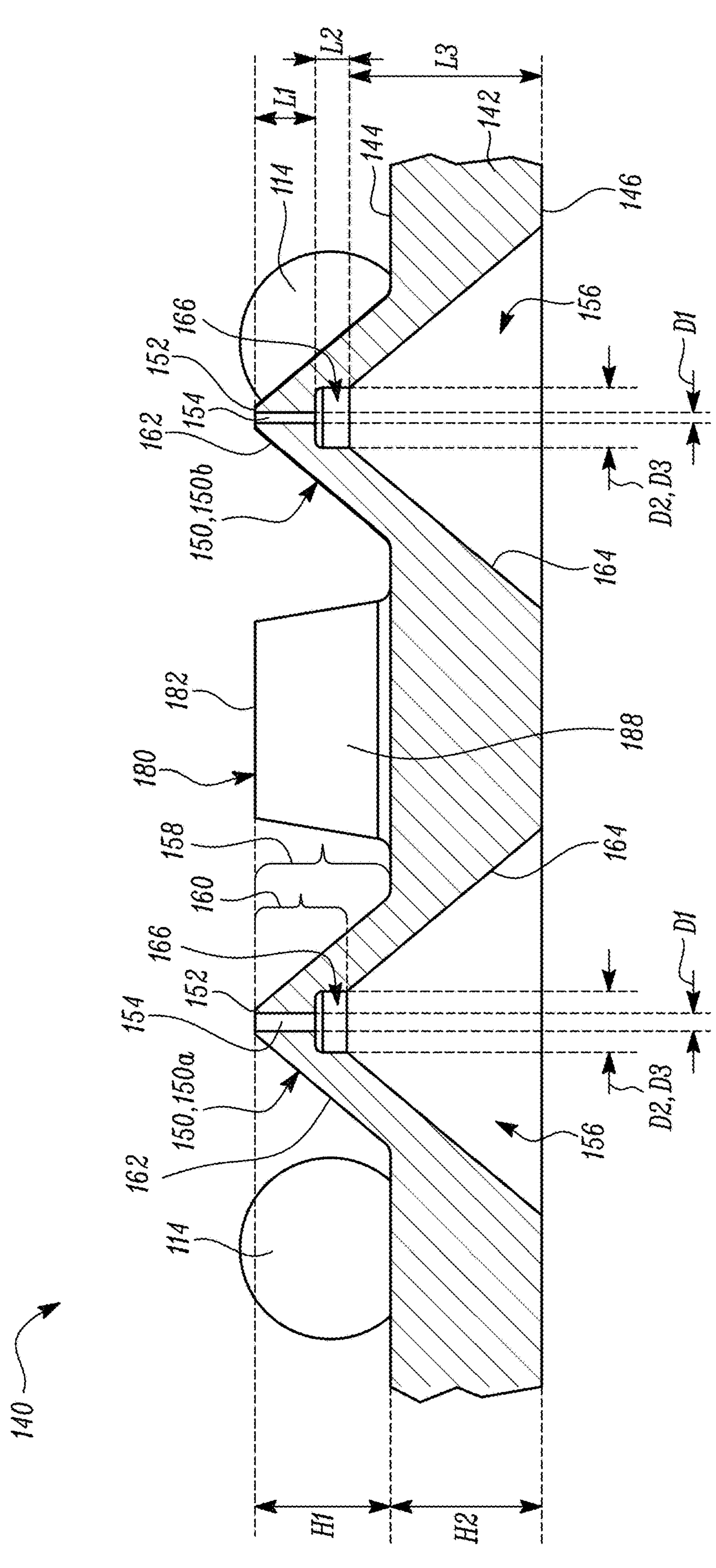
FIG. 5 is a schematic partial sectional view of the fixture taken along a section line A-A' shown in FIG. 3.
Figure 6:
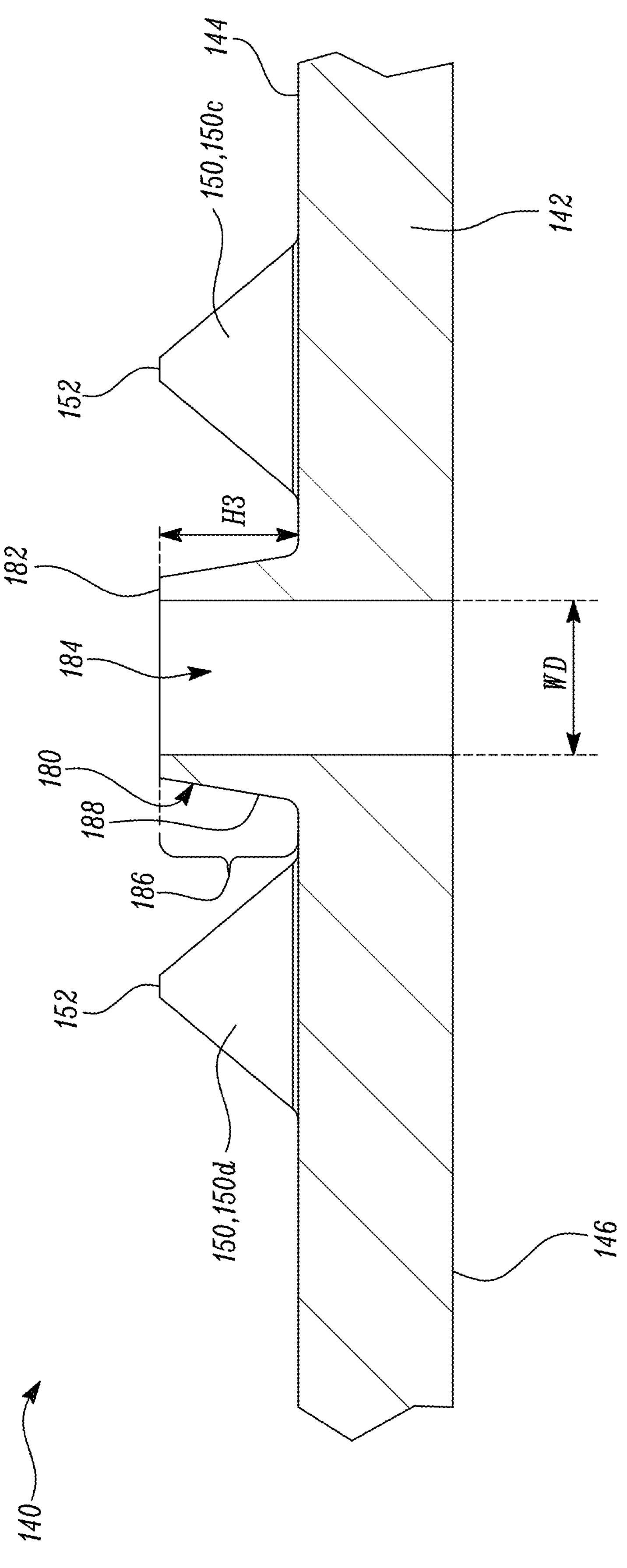
FIG. 6 is a schematic partial sectional view of the fixture taken along a section line B-B' shown in FIG. 3.

FIGS. 3 and 4 are schematic top and bottom perspective views of the fixture plate 140, respectively. FIGS. 5 and 6 are schematic partial sectional views of the fixture plate 140 taken along a section line A-A' and a section line B-B' shown in FIG. 3, respectively. In the illustrated embodiment of FIG. 5, only the pinhole members 150*a*, 150*b* are visible. The features described with reference to the pinhole members 150*a*, 150*b* are also equally applicable to the other pinhole members 150*c*, 150*d*.

Referring to FIGS. 3-6, in the illustrated embodiments, the main body 142 of the fixture plate 140 is substantially rectangular-shaped. However, in alternative embodiments, the main body 142 may include any suitable shape. Further, the main body 142 is substantially planar or flat.

Each pinhole member 150*a*, 150*b*, 150*c*, 150*d* from the plurality of pinhole members 150 includes a tip 152 (shown in FIGS. 3, 5 and 6) spaced apart from the top surface 144, a cylindrical hole 154 (shown in FIG. 5) extending from the tip 152 towards the top surface 144, and a discharge passage 156 (shown in FIGS. 4 and 5) extending from the bottom surface 146 at least partially through the main body 142 and disposed in fluid communication with the cylindrical hole 154.

The cylindrical hole 154 of each pinhole member 150*a*, 150*b*, 150*c*, 150*d* has a diameter D1 (shown in FIG. 5) and is configured to receive the powder 104 (shown in FIG. 1) from the nozzle 110 (shown in FIG. 1). The nozzle 110 is configured to dispense the powder 104 selectively into the cylindrical hole 154 of each pinhole member 150*a*, 150*b*, 150*c*, 150*d*. The powder collector 118 (shown in FIG. 1) is configured to receive at least the portion of the powder 104 from the discharge passage 156 of each pinhole member 150*a*, 150*b*, 150*c*, 150*d*.

The diameters D1 of the cylindrical holes 154 of the plurality of pinhole members 150 are different from each other. For example, the diameters D1 of the cylindrical holes 154 of the plurality of pinhole members 150*a*, 150*b*, 150*c*, 150*d* are about 1.2 mm, 0.7 mm, 0.8 mm, and 1.0 mm, respectively. Thus, the flow rate of the powder 104 (shown in FIG. 1) may be tested using different sizes of cylindrical holes 154.

As shown in FIG. 5, in some embodiments, each pinhole member 150*a*, 150*b*, 150*c*, 150*d* further includes a frustoconical external surface 162 extending from the top surface 144 and tapering towards the tip 152. In some embodiments, each pinhole member 150*a*, 150*b*, 150*c*, 150*d* further includes a frustoconical internal surface 164 spaced apart from and coaxial with the frustoconical external surface 162. In some embodiments, the frustoconical internal surface 164 extends from the bottom surface 146 beyond the top surface 144 and fully defines the discharge passage 156, such that the discharge passage 156 is frustoconical and tapers from the bottom surface 146 towards the cylindrical hole 154.

In some embodiments, each pinhole member 150*a*, 150*b*, 150*c*, 150*d* further includes a cylindrical connecting passage 166 fluidly communicating the cylindrical hole 154 with the discharge passage 156, such that the discharge passage 156 tapers from the bottom surface 146 to the cylindrical connecting passage 166. In some embodiments, the cylindrical hole 154, the cylindrical connecting passage 166, and the discharge passage 156 are coaxial with each other. This may allow the powder 104 (shown in FIG. 1) received within the cylindrical hole 154 to flow through the fixture plate 140 in an unrestricted manner.

In some embodiments, a diameter D2 of the cylindrical connecting passage 166 is at least twice the diameter D1 of the cylindrical hole 154. This may allow the powder 104 (shown in FIG. 1) received within the cylindrical hole 154 to easily flow to the cylindrical connecting passage 166. In some embodiments, a minimum diameter D3 of the discharge passage 156 is greater than the diameter D1 of the cylindrical hole 154. In the illustrated embodiment of FIG. 5, the minimum diameter D3 of the discharge passage 156 is equal to the diameter D2 of the cylindrical connecting passage 166. This may allow the powder 104 (shown in FIG. 1) received within the cylindrical hole 154 to flow to the discharge passage 156 in an unrestricted manner.

In some embodiments, an axial length L1 of the cylindrical hole 154 is at least twice an axial length L2 of the cylindrical connecting passage 166. In some embodiments, an axial length L3 of the discharge passage 156 is at least thrice the axial length L1 of the cylindrical hole 154. This may allow unrestricted flow of the powder 104 (shown in FIG. 1) from the cylindrical hole 154 to the discharge passage 156 in an accurate manner.

In some embodiments, each pinhole member 150*a*, 150*b*, 150*c*, 150*d* further includes a conical portion 158 tapering from the top surface 144 to the tip 152 and forming the frustoconical external surface 162 and at least a portion of the frustoconical internal surface 164. In some embodiments, a height H1 of the conical portion 158 from the top surface 144 is less than a thickness H2 of the main body 142 between the top surface 144 and the bottom surface 146. This may allow the conical portion 158 to extend away from the top surface 144, thereby defining the frustoconical external surface 162 and at least the portion of the frustoconical internal surface 164. In some embodiments, the height H1 of the conical portion 158 of each pinhole member 150*a*, 150*b*, 150*c*, 150*d* is similar to each other. In some embodiments, the conical portion 158 includes a top section 160 disposed at the tip 152. In some embodiments, the top section 160 fully defines the cylindrical hole 154 and the cylindrical connecting passage 166.

As shown in FIG. 6, in some embodiments, the fixture plate 140 further includes the wide member 180 extending at least partially from the top surface 144. In some embodiments, the wide member 180 includes a wide distal end 182 spaced apart from the top surface 144 and a wide cylindrical passage 184 extending from the wide distal end 182 to the bottom surface 146 at least partially through the main body 142.

In some embodiments, the wide cylindrical passage 184 has a wide diameter WD that is at least five times the diameter D1 (shown in FIG. 5) of the cylindrical hole 154 of each pinhole member 150*a*, 150*b*, 150*c*, 150*d*. For example, the wide diameter WD may be about 10 mm. In some embodiments, the wide member 180 further includes a wide conical portion 186 extending from the top surface 144 and including a wide frustoconical external surface 188. In some embodiments, a height H3 of the wide conical portion 186 from the top surface 144 is equal to the height H1 (shown in FIG. 5) of the conical portion 158 (shown in FIG. 5) from the top surface 144. In some embodiments, a taper angle of the wide frustoconical external surface 188 is greater than a taper angle of the frustoconical external surface 162 (shown in FIG. 5) of each pinhole member 150*a*, 150*b*, 150*c*, 150*d*.

Figure 7:
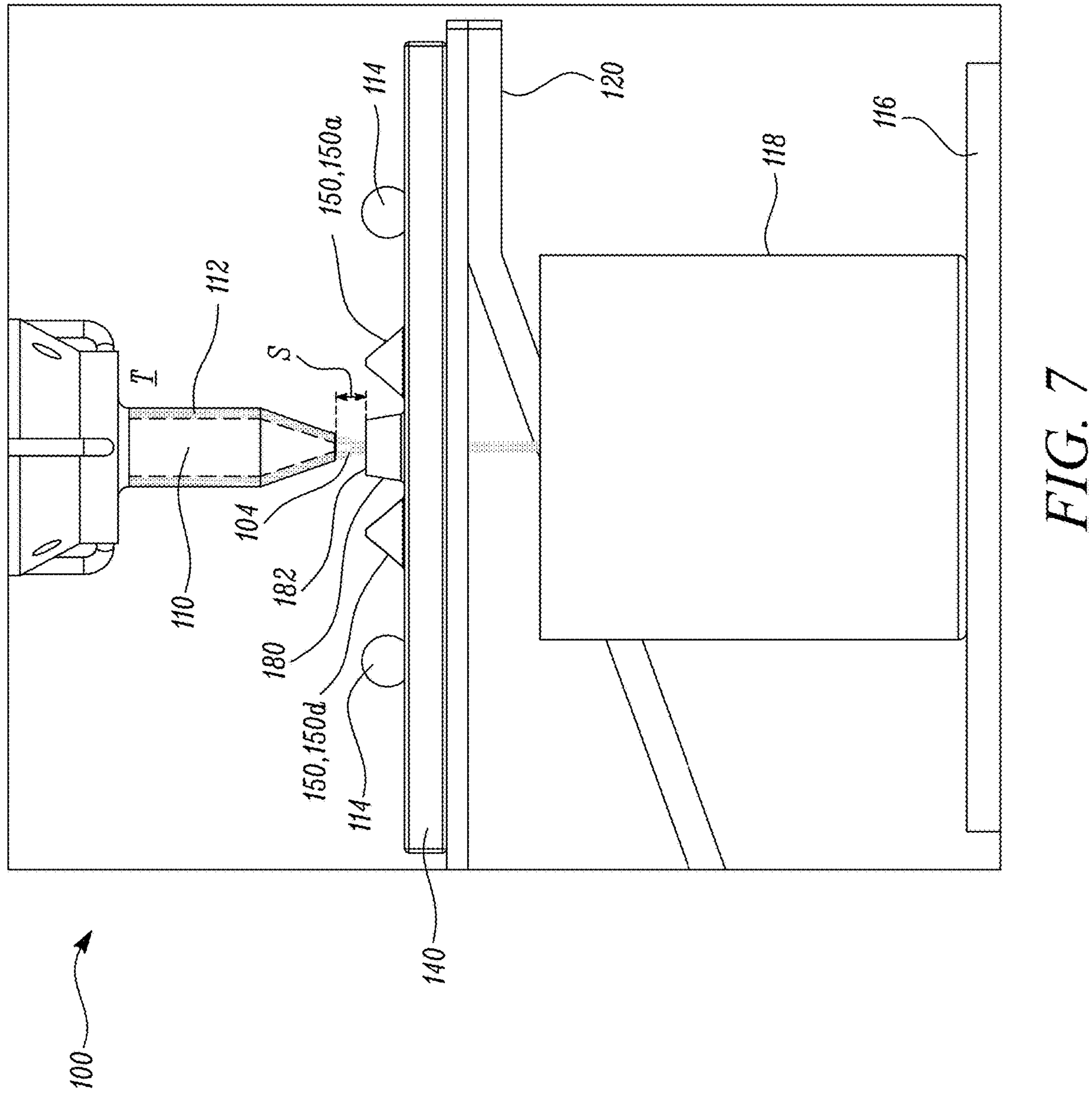
FIG. 7 is a schematic partial side view of the measurement apparatus where the nozzle is aligned with a wide member of the fixture.

FIG. 7 is a schematic partial side view of the measurement apparatus 100. Some components (e.g., the casing 102) of the measurement apparatus 100 are not shown for the purpose of illustration. In the illustrated embodiment of FIG. 7, the nozzle 110 is aligned with a geometric centre of the wide member 180. A tip of the nozzle 110 is disposed at a predetermined distance S from the wide distal end 182 of the wide member 180. This predetermined distance S is also referred to herein as the stand-off distance.

Referring to FIGS. 6 and 7, the nozzle 110 is configured to dispense the powder 104 selectively into the wide cylindrical passage 184 (shown in FIG. 6) of the wide member 180 for the same predetermined period of time T. In some embodiments, the powder collector 118 is configured to receive at least a portion of the powder 104 from the wide cylindrical passage 184 of the wide member 180.

In some cases, nearly all the powder 104 dispensed by the nozzle 110 passes through the wide diameter WD (shown in FIG. 6) of the wide cylindrical passage 184 since the wide diameter WD is much larger than the diameter D1 (shown in FIG. 5) of the cylindrical hole 154 (shown in FIG. 5) of each pinhole member 150. The weight of the powder 104 received by the powder collector 118 is then indicated by the weighing scale 116. This represents a total powder flow mass $M_t$ of the powder 104 in the predetermined period of time T.

The wide diameter WD of the wide cylindrical passage 184 may allow unrestricted flow of the powder 104 received from the nozzle 110 to the powder collector 118, thereby enabling determination of the total powder flow mass $M_t$ in the predetermined period of time T. Further, the wide frustoconical external surface 188 may allow extra powder 104 that does not pass through the wide cylindrical passage 184 to clear off from a top opening of the wide cylindrical passage 184.

Figure 8:
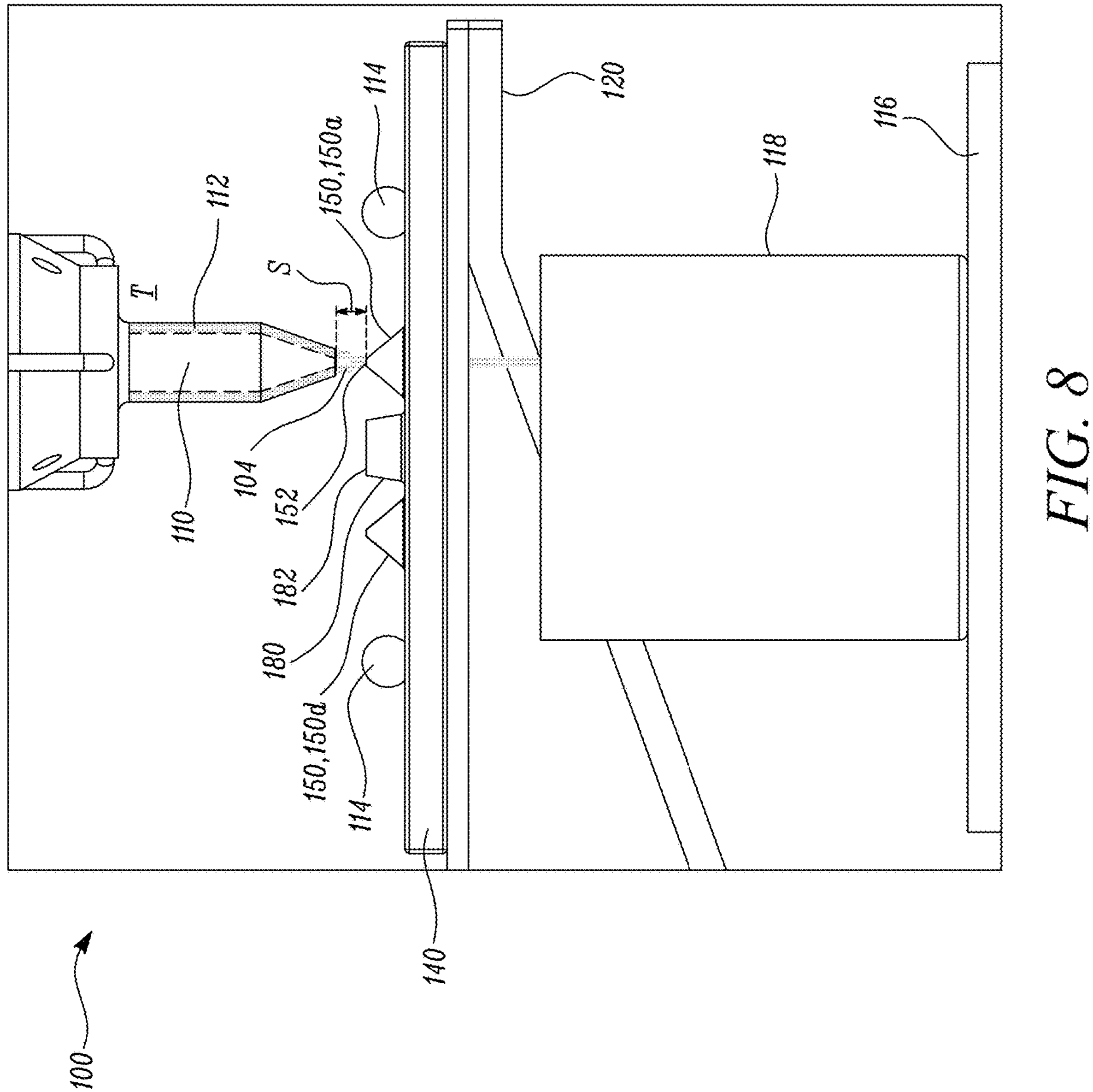
FIG. 8 is a schematic partial side view of the measurement apparatus where a nozzle of the measurement apparatus is aligned with a pinhole member of the fixture

FIG. 8 is a schematic partial side view of the measurement apparatus 100. Some components (e.g., the casing 102) of the measurement apparatus 100 are not shown for the purpose of illustration. In the illustrated embodiment of FIG. 8, the nozzle 110 is aligned a geometric centre of the pinhole member 150*a*. However, in alternative embodiments, the nozzle 110 may also be aligned with any other pinhole member 150. In some embodiments, the pinhole member 150 from the plurality of pinhole members 150 may be chosen based on a wear and tear of the nozzle 110. In some embodiments, the tip of the nozzle 110 is disposed at the predetermined distance S (or the stand-off distance) from the tip 152 of the pinhole member 150*a*.

Referring to FIGS. 5 and 8, the nozzle 110 is configured to dispense the powder 104 selectively into the cylindrical hole 154 (shown in FIG. 5) of the pinhole member 150*a* for a predetermined period of time T. In some embodiments, the cylindrical hole 154 of the pinhole member 150*a* may receive at least a portion of the powder 104 dispensed by the nozzle 110. Depending on an impact direction and a location of grains of the powder 104 at an edge of the cylindrical hole 154, the grains may bounce back or pass through the cylindrical hole 154. The grains that bounce back are referred to herein as rebounding grains. Thus, an effective pinhole area $A_{ph}$ may be defined that is smaller than an actual pinhole area (based on the diameter D1 of the cylindrical hole 154). Effective pinhole area $A_{ph}$ may be determined according to the Equation 1 provided below:

$$A_{ph} = \frac{\pi}{4}\left(D1 - \frac{D_{ave}}{\sqrt{2}}\right)^2 \quad \text{(Equation 1)}$$

where, $D_{ave}$ is a mean diameter of the grains of the powder 104 and D1 is the diameter of the cylindrical hole 154.

In some embodiments, the rebounding grains of the powder 104 may run-off the conical portion 158 (shown in FIG. 5) of the pinhole member 150*a* along the frustoconical external surface 162. Thus, the extra powder 104 that does not pass through the cylindrical hole 154 may clear off from the tip 152 of the pinhole member 150*a*. The portion of the powder 104 received by the cylindrical hole 154 in the predetermined period of time T is then received by the powder collector 118. In some embodiments, the cylindrical connecting passage 166 may allow the powder 104 received within the cylindrical hole 154 to smoothly pass to the discharge passage 156. Further, the frustoconical internal surface 164 of the discharge passage 156 may allow the powder 104 to unrestrictedly pass through the fixture plate 140. Subsequently, the weighing scale 116 may indicate the weight of powder 104 received in the powder collector 118. This weight of the powder 104 is referred to herein as a pinhole powder flow mass $M_{ph}$.

A flow rate $R_p$ through the nozzle 110 in the predetermined period of time T for the predetermined distance S and diameter D1 (shown in FIG. 5) of the cylindrical hole 154 may be determined according to Equation 2 provided below:

$$R_p(S, D1) = \frac{M_{ph}}{M_t A_{ph}} \quad \text{(Equation 2)}$$

where, $M_{ph}$ is the pinhole powder flow mass, $M_t$ is the total powder flow mass, and $A_{ph}$ is the effective pinhole area.

In some embodiments, the flow rate $R_p$ through the nozzle 110 may be measured by varying the predetermined distance S (or the stand-off distance) and the diameter D1 of the cylindrical hole 154. Variations of the flow rate $R_p$ may be plotted against the predetermined distance S for the given diameter D1 of the cylindrical hole 154. An example of such a plot is shown in FIG. 9.

Figure 9:
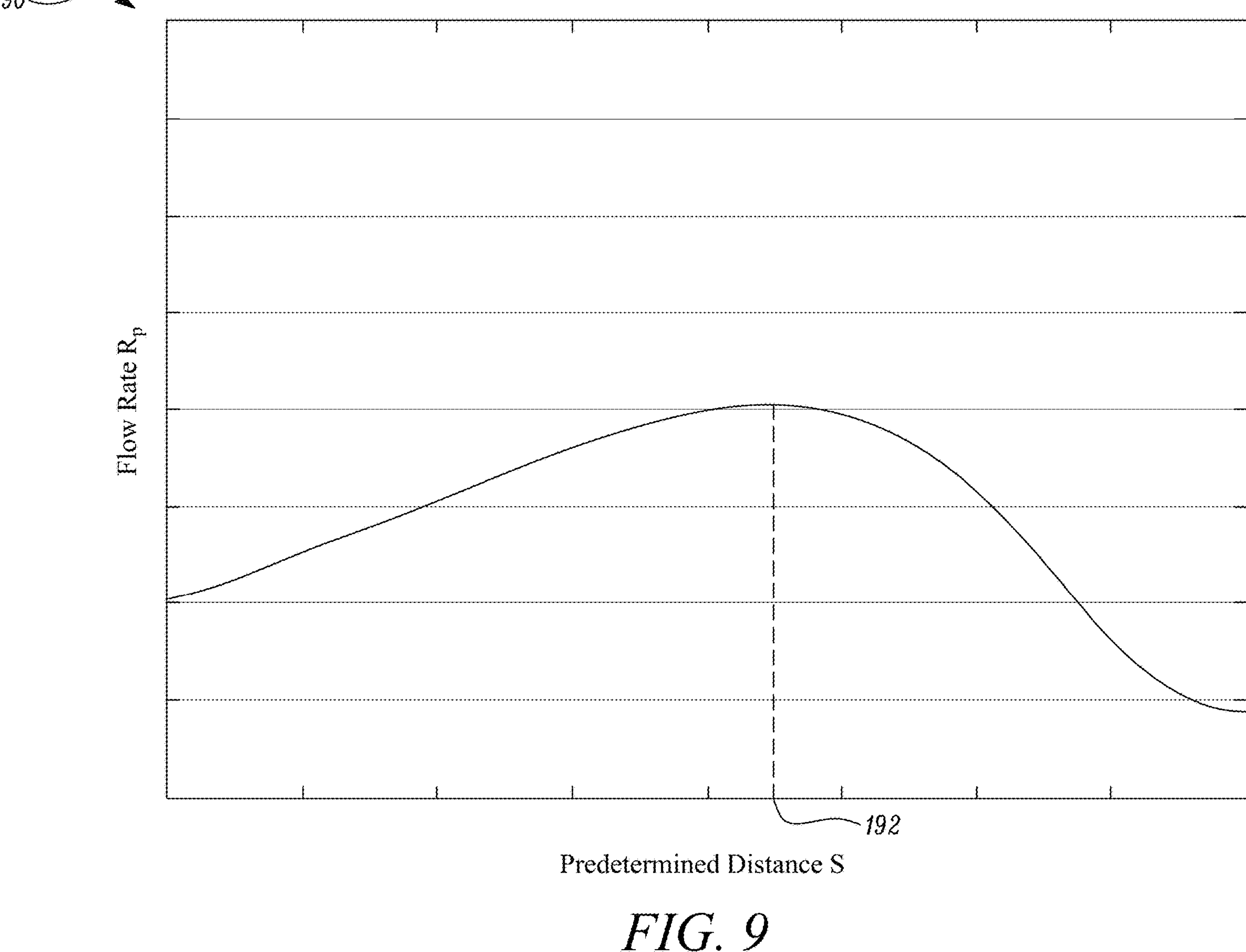
FIG. 9 is a graph illustrating a variation of a flow rate of a powder dispensed by the nozzle with a predetermined distance between a tip of the nozzle and a tip of the pinhole member.

FIG. 9 is a graph 190 illustrating an example of a variation of the flow rate $R_p$ with respect to the predetermined distance S (or the stand-off distance). The flow rate $R_p$ is shown along the vertical axis or ordinate of the graph 190 and the predetermined distance S is shown along the horizontal axis or abscissa of the graph 190. Based on the graph 190, an optimum stand-off distance 192 for the given diameter D1 (shown in FIG. 5) of the cylindrical hole 154 (shown in FIG. 5) may be determined.

Figure 10:
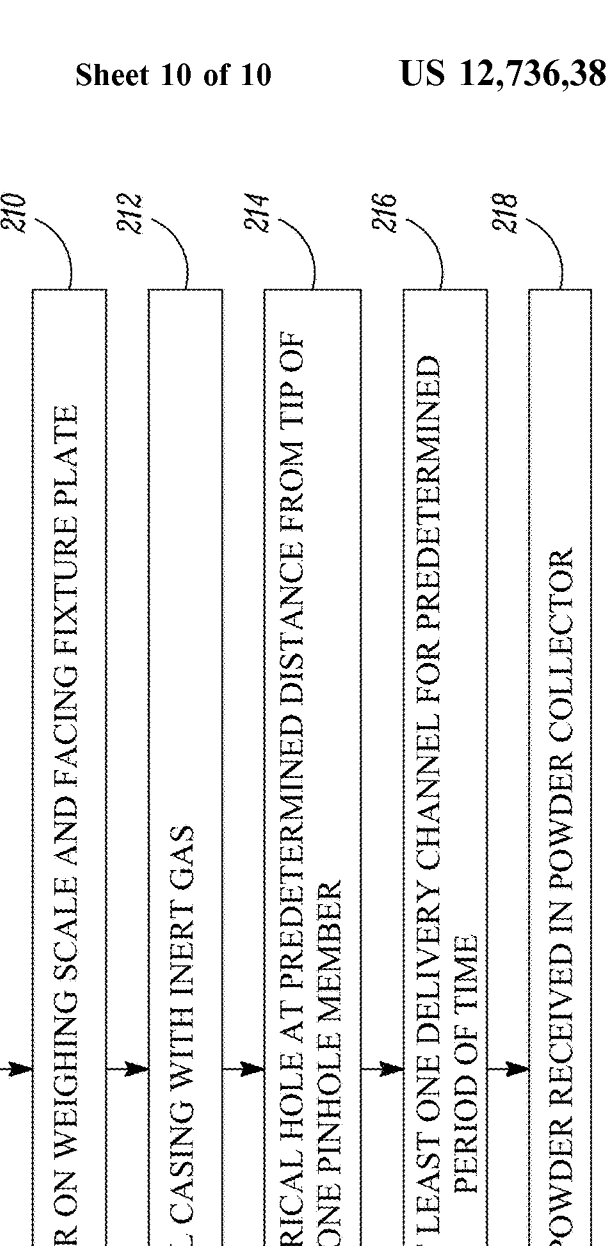
FIG. 10 is a flowchart illustrating a method for measuring the flow rate of the powder.

FIG. 10 is a flowchart illustrating a method 200 for measuring a flow rate of the powder 104 (shown in FIGS. 1, 8 and 9). The method 200 may be implemented using the measurement apparatus 100 of FIGS. 1-2, 7 and 8, and the fixture plate 140 of FIGS. 3-6.

Referring to FIGS. 1-8 and 10, at step 202, the method 200 includes providing the casing 102. At step 204, the method 200 further includes movably receiving the nozzle 110 within the casing 102. The nozzle 110 includes the at least one delivery channel 112 configured to dispense the powder 104. At step 206, the method 200 further includes providing the fixture plate 140 disposed within and mounted to the casing 102.

The fixture plate 140 includes the main body 142 including the top surface 144 facing the nozzle 110 and the bottom surface 146 spaced apart from and opposite to the top surface 144. The fixture plate 140 further includes the plurality of pinhole members 150*a*, 150*b*, 150*c*, 150*d* extending at least partially from the top surface 144 and spaced apart from each other. Each pinhole member 150*a*, 150*b*, 150*c*, 150*d* from the plurality of pinhole members 150 includes the tip 152 spaced apart from the top surface 144, the cylindrical hole 154 extending from the tip 152 towards the top surface 144, and the discharge passage 156 extending from the bottom surface 146 at least partially through the main body 142 and disposed in fluid communication with the cylindrical hole 154. The cylindrical hole 154 of each pinhole member 150*a*, 150*b*, 150*c*, 150*d* has the diameter D1 and is configured to receive the powder 104 from the nozzle 110. The diameters D1 of the cylindrical holes 154 of the plurality of pinhole members 150 are different from each other.

In some embodiments, the fixture plate 140 further includes the wide member 180 spaced apart from each pinhole member 150*a*, 150*b*, 150*c*, 150*d* and extending at least partially from the top surface 144. The wide member 180 includes the wide distal end 182 spaced apart from the top surface 144 and the wide cylindrical passage 184 extending from the wide distal end 182 to the bottom surface 146 at least partially through the main body 142. The wide cylindrical passage 184 has the wide diameter WD that is at least five times the diameter D1 of the cylindrical hole 154 of each pinhole member 150*a*, 150*b*, 150*c*, 150*d*.

At step 208, the method 200 further includes providing the weighing scale 116 underneath the fixture plate 140 within the casing 102. At step 210, the method 200 further includes providing the powder collector 118 on the weighing scale 116 and facing the fixture plate 140. At step 212, the method 200 further includes filling the casing 102 with the inert gas IG.

At step 214, the method 200 further includes positioning the nozzle 110 above the cylindrical hole 154 at the predetermined distance S from the tip 152 of one pinhole member 150*a* from the plurality of pinhole members 150. In some embodiments, the method 200 further includes resetting the weighing scale 116 prior to positioning the nozzle 110 above the one pinhole member 150*a*. This may allow accurate measurement of the weight of the powder 104 received in the powder collector 118 after the powder 104 is dispensed into the one pinhole member 150*a*. At step 216, the method 200 further includes dispensing the powder 104 through the at least one delivery channel 112 for the predetermined period of time T. At step 218, the method 200 further includes recording, via the weighing scale 116, the weight of the powder 104 received in the powder collector 118.

In some embodiments, the method 200 further includes modifying the predetermined distance S of the nozzle 110 from the tip 152 of the one pinhole member 150*a*. Thus, the method 200 may allow the predetermined distance S to be modified during the measurement process for determining the optimum stand-off distance 192.

In some embodiments, the method 200 further includes positioning the nozzle 110 above the wide member 180 at the predetermined distance S from the wide distal end 182 of the wide member 180 prior to positioning the nozzle 110 above the one pinhole member 150*a*. In some embodiments, the method 200 further includes dispensing the powder 104 through the at least one delivery channel 112 for the predetermined period of time T. In some embodiments, the method 200 further includes recording, via the weighing scale 116, the weight of the powder 104 received in the powder collector 118.

Referring to FIGS. 1-10, the measurement apparatus 100 includes the fixture plate 140 disposed within and mounted to the casing 102. The fixture plate 140 includes the plurality of pinhole members 150. The diameters D1 of the cylindrical holes 154 of the plurality of pinhole members 150 are different from each other. This may allow the flow rate of the powder 104 to be measured using different diameters of the cylindrical holes 154.

The nozzle 110 may dispense the powder 104 selectively into the cylindrical hole 154 of each pinhole member 150. Specifically, the measurement apparatus 100 may be programmed to selectively position the nozzle 110 above the cylindrical hole 154 of each pinhole member 150 for dispensing the powder 104. Thus, the measurement apparatus 100 and the method 200 of the present disclosure may allow automatic measurement of the flow rate of the powder 104, thereby eliminating the traditional manual process. This may enhance a repeatability of the measurement process.

Further, the weighing scale 116 is disposed within the casing 102 underneath the fixture plate 140. Thus, the casing 102 may not require to be evacuated for determining the weight of the powder 104 received in the powder collector 118 after dispending the powder 104 into the cylindrical hole 154 of each pinhole member 150. This may allow measurement data to be obtained quickly and accurately. Furthermore, the predetermined distance S may be modified during the measurement process for determining the optimum stand-off distance 192. Thus, the flow rate of the powder 104 from the nozzle 110 may be measured multiple times, each time at a different distance between the tip of the nozzle 110 and the tip 152 of the corresponding pinhole member 150.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A measurement apparatus for measuring a flow rate of a powder, the measurement apparatus comprising:

- a casing;
- a nozzle movably disposed within the casing, the nozzle comprising at least one delivery channel configured to dispense the powder;
- a fixture plate disposed within and mounted to the casing, the fixture plate comprising:
  - a main body comprising a top surface facing the nozzle and a bottom surface spaced apart from and opposite to the top surface; and
  - a plurality of pinhole members extending at least partially from the top surface and spaced apart from each other, wherein each pinhole member from the plurality of pinhole members comprises a tip spaced apart from the top surface, a cylindrical hole extending from the tip towards the top surface, and a discharge passage extending from the bottom surface at least partially through the main body and disposed in fluid communication with the cylindrical hole, wherein the cylindrical hole of each pinhole member has a diameter and is configured to receive the powder from the nozzle, and wherein the diameters of the cylindrical holes of the plurality of pinhole members are different from each other;
- a weighing scale disposed within the casing underneath the fixture plate; and
- a powder collector disposed on the weighing scale and facing the fixture plate;
- wherein the nozzle is configured to dispense the powder selectively into the cylindrical hole of each pinhole member, and wherein the powder collector is configured to receive at least a portion of the powder from the discharge passage of each pinhole member.

2. The measurement apparatus of claim 1, wherein each pinhole member further comprises:

- a frustoconical external surface extending from the top surface and tapering towards the tip; and
- a frustoconical internal surface spaced apart from and coaxial with the frustoconical external surface, wherein the frustoconical internal surface extends from the bottom surface beyond the top surface and fully defines the discharge passage, such that the discharge passage is frustoconical and tapers from the bottom surface towards the cylindrical hole.

3. The measurement apparatus of claim 2, wherein each pinhole member further comprises a cylindrical connecting passage fluidly communicating the cylindrical hole with the discharge passage, such that the discharge passage tapers from the bottom surface to the cylindrical connecting passage, and wherein a diameter of the cylindrical connecting passage is at least twice the diameter of the cylindrical hole.

4. The measurement apparatus of claim 3, wherein an axial length of the cylindrical hole is at least twice an axial length of the cylindrical connecting passage, and wherein an axial length of the discharge passage is at least thrice the axial length of the cylindrical hole.

5. The measurement apparatus of claim 3, wherein the cylindrical hole, the cylindrical connecting passage, and the discharge passage are coaxial with each other.

6. The measurement apparatus of claim 2, wherein each pinhole member further comprises a conical portion tapering from the top surface to the tip and forming the frustoconical external surface and at least a portion of the frustoconical internal surface, the conical portion comprising a top section disposed at the tip, and wherein the top section fully defines the cylindrical hole and the cylindrical connecting passage.

7. The measurement apparatus of claim 6, wherein a height of the conical portion from the top surface is less than a thickness of the main body between the top surface and the bottom surface.

8. The measurement apparatus of claim 1, wherein a minimum diameter of the discharge passage is greater than the diameter of the cylindrical hole.

9. The measurement apparatus of claim 1, wherein the fixture plate further comprises a wide member spaced apart from each pinhole member and extending at least partially from the top surface, the wide member comprising a wide distal end spaced apart from the top surface and a wide cylindrical passage extending from the wide distal end to the bottom surface at least partially through the main body, wherein the wide cylindrical passage has a wide diameter that is at least five times the diameter of the cylindrical hole of each pinhole member, wherein the nozzle is configured to dispense the powder selectively into the wide cylindrical passage of the wide member, and wherein the powder collector is configured to receive at least a portion of the powder from the wide cylindrical passage of the wide member.

10. The measurement apparatus of claim 9, wherein the wide member further comprises a wide conical portion extending from the top surface and comprising a wide frustoconical external surface.

11. The measurement apparatus of claim 1, further comprising one or more positioning features disposed on the top surface of the fixture plate.

12. The measurement apparatus of claim 1, further comprising a support structure fixedly coupled to the casing, wherein the fixture plate is adjustably mounted to the support structure.

13. The measurement apparatus of claim 12, wherein the casing comprises a bottom wall, one or more side walls extending from the bottom wall, and a top wall coupled to the one or more side walls opposite to the bottom wall, wherein the weighing scale is disposed on the bottom wall, and wherein the support structure is coupled to one of the side walls.

14. The measurement apparatus of claim 13, wherein the support structure comprises:

- a first member fixedly coupled to the one of the side walls of the casing;
- a second member comprising a vertical portion adjustably coupled to the first member and a horizontal portion extending parallel to the top surface, wherein the fixture plate is adjustably coupled to the horizontal portion; and a pair of arms, wherein each of the pair of arms comprises a first arm end coupled to the vertical portion and a second arm end coupled to the horizontal portion.

15. The measurement apparatus of claim 14, wherein the vertical portion of the second member is adjustable relative to the first member along a first direction substantially parallel to the top surface, and wherein the fixture plate is adjustable relative to the horizontal portion along a second direction substantially parallel to the top surface and perpendicular to the first direction.

16. The measurement apparatus of claim 1, wherein the casing is filled with an inert gas.

17. A method for measuring a flow rate of a powder, the method comprising the steps of:

providing a casing;

movably receiving a nozzle within the casing, the nozzle comprising at least one delivery channel configured to dispense the powder;

providing a fixture plate disposed within and mounted to the casing, the fixture plate comprising:

a main body comprising a top surface facing the nozzle and a bottom surface spaced apart from and opposite to the top surface; and a plurality of pinhole members extending at least partially from the top surface and spaced apart from each other, wherein each pinhole member from the plurality of pinhole members comprises a tip spaced apart from the top surface, a cylindrical hole extending from the tip towards the top surface, and a discharge passage extending from the bottom surface at least partially through the main body and disposed in fluid communication with the cylindrical hole, wherein the cylindrical hole of each pinhole member has a diameter and is configured to receive the powder from the nozzle, and wherein the diameters of the cylindrical holes of the plurality of pinhole members are different from each other;

providing a weighing scale underneath the fixture plate within the casing;

providing a powder collector on the weighing scale and facing the fixture plate;

filling the casing with an inert gas;

positioning the nozzle above the cylindrical hole at a predetermined distance from the tip of one pinhole member from the plurality of pinhole members;

dispensing the powder through the at least one delivery channel for a predetermined period of time; and recording, via the weighing scale, a weight of the powder received in the powder collector.

18. The method of claim 17, wherein the fixture plate further comprises a wide member spaced apart from each pinhole member and extending at least partially from the top surface, the wide member comprising a wide distal end spaced apart from the top surface and a wide cylindrical passage extending from the wide distal end to the bottom surface at least partially through the main body, wherein the wide cylindrical passage has a wide diameter that is at least five times the diameter of the cylindrical hole of each pinhole member, the method further comprising:

positioning the nozzle above the wide member at the predetermined distance from the wide distal end of the wide member prior to positioning the nozzle above the one pinhole member;

dispensing the powder through the at least one delivery channel for the predetermined period of time; and recording, via the weighing scale, a weight of the powder received in the powder collector.

19. The method of claim 17, further comprising resetting the weighing scale prior to positioning the nozzle above the one pinhole member.

20. The method of claim 17, further comprising modifying the predetermined distance of the nozzle from the tip of the one pinhole member.

* * * * *